(12) United States Patent
Devraj

(10) Patent No.: US 9,234,074 B2
(45) Date of Patent: Jan. 12, 2016

(54) FLAKES OF ESTER MIXTURES AND METHODS FOR THEIR PRODUCTION

(71) Applicant: PerPETual Global Technologies Limited, Ebene (MU)

(72) Inventor: Shankar Devraj, Maharashtra (IN)

(73) Assignee: PerPETual GLOBAL TECHNOLOGIES LIMITED, Ebene (MU)

( * ) Notice: Subject to any disclaimer, the term of this patent is extended or adjusted under 35 U.S.C. 154(b) by 0 days.

(21) Appl. No.: 14/391,988

(22) PCT Filed: Apr. 18, 2013

(86) PCT No.: PCT/IN2013/000256
§ 371 (c)(1),
(2) Date: Oct. 10, 2014

(87) PCT Pub. No.: WO2013/175497
PCT Pub. Date: Nov. 28, 2013

(65) Prior Publication Data
US 2015/0065680 A1  Mar. 5, 2015

(30) Foreign Application Priority Data

Apr. 20, 2012 (IN) .......................... 1271/MUM/2012

(51) Int. Cl.
| | |
|---|---|
| *C08G 63/02* | (2006.01) |
| *C08G 63/78* | (2006.01) |
| *C08J 11/04* | (2006.01) |
| *B01J 2/12* | (2006.01) |
| *B01J 2/24* | (2006.01) |
| *C08G 63/00* | (2006.01) |

(52) U.S. Cl.
CPC . *C08G 63/78* (2013.01); *B01J 2/12* (2013.01); *B01J 2/24* (2013.01); *C08J 11/04* (2013.01)

(58) Field of Classification Search
CPC ..................................................... C08G 63/183
USPC .................. 528/176, 190, 192, 193, 271, 272
See application file for complete search history.

(56) References Cited

U.S. PATENT DOCUMENTS

| | | |
|---|---|---|
| 4,609,680 A | 9/1986 | Fujita et al. |
| 5,635,584 A | 6/1997 | Ekart et al. |
| 2006/0110557 A1* | 5/2006 | Xia et al. ..................... 428/35.7 |

FOREIGN PATENT DOCUMENTS

| | | |
|---|---|---|
| EP | 1510514 A1 | 3/2005 |
| GB | 610136 | 10/1948 |
| JP | 2005154671 A | 6/2005 |
| JP | 2005154671 * | 6/2006 |
| WO | 9323465 A1 | 11/1993 |
| WO | 9527753 A1 | 10/1995 |
| WO | 9950332 A1 | 10/1999 |
| WO | 0017142 A1 | 3/2000 |
| WO | 0017151 A1 | 3/2000 |
| WO | 2005079140 A2 | 9/2005 |

OTHER PUBLICATIONS

Thomson Scientific, London, GB, AN 2005-461446, Database WPI Week 200547, XP-002713987 (2 pages).

* cited by examiner

*Primary Examiner* — Terressa Boykin
(74) *Attorney, Agent, or Firm* — Drinker Biddle & Reath LLP

(57) ABSTRACT

There is provided flakes of an ester mixture comprising bis-(hydroxyethyl)-terephthalate, dimers, tamers, tetramers, pentamers and higher oligomers of ethane-1,2-diol and terephthalate acid.

24 Claims, 1 Drawing Sheet

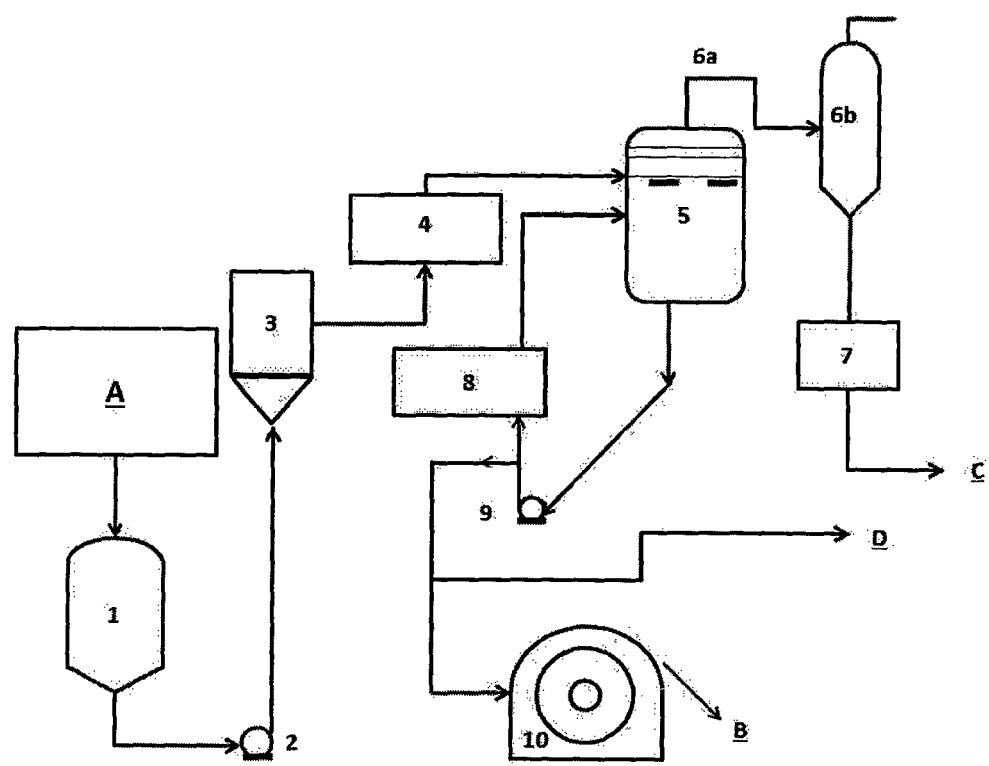

US 9,234,074 B2

FLAKES OF ESTER MIXTURES AND METHODS FOR THEIR PRODUCTION

FIELD OF THE INVENTION

The present invention relates to products and methods relevant to polyethylene terephthalate processes. Particularly, the present invention relates to flakes of an ester mixture, methods for producing the flakes and methods for using ester mixtures having a low free glycol content.

BACKGROUND OF THE INVENTION

In this specification, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

Polyethylene terephthalate (PET) is a thermoplastic polyester formed by the reaction of ethane-1,2-diol (also known as ethanediol, 1,2-dihydroxyethane, monoethylene glycol or MEG) and purified terephthalic acid (PTA) by direct esterification to form bis-(hydroxyethyl) terephthalate ester ("BHET") which is then polymerised by catalysed ester exchange to useful polymers.

Traditionally, PET has been used extensively because it can be formed into an oriented film or fibre, has high tenacity, good electrical resistance, low moisture absorption, and a melting point greater than 245° C. PET has been found to be particularly valuable for the manufacture of bottles for containing carbonated drinks where bottles must have good tensile strength, exhibit superior mechanical properties, contain pressure, and have a low mass convenient for transport and use. Such PET bottles are also extensively used for non-carbonated drinks.

The extensive use of PET bottles has given rise to the need to recycle PET bottles after their contents are consumed. Similarly, there is a need to recycle post-use PET film, PET textiles and apparel products, and the in-process PET waste arising from the manufacture of all PET products. Today, PET is mainly recycled using either of two distinct methods, namely mechanical and chemical.

In the mechanical process, PET waste (which includes post-consumer PET) is cut and washed to obtain PET flakes. These flakes are then converted to various end products using conventional polyester processes. However, such flakes are frequently contaminated leading to products having a quality which is not comparable with product made from the high purity virgin petrochemical feedstocks typically used for making polyester.

Conventionally, chemical recycling of PET relies on depolymerising the PET waste by treating it with a significant concentration of glycol at high temperature. This glycolysis yields a product consisting primarily of esters of varying molecular weights. The mixture of esters generally includes BHET, dimers, trimers, tetramers and higher oligomers. Such esters from conventional chemical recycling processes cannot be stored as a liquid for prolonged periods because elevated temperatures (above 200° C.) result in degradation of the mixtures of the esters and formation of unfavourable by-products which are detrimental to the desired quality and consistency of the end products. As a result, the chemical recycler of waste PET at a given plant generally processes the recovered esters immediately for a narrow single application or final product form.

For example, GB 610,136 discloses a process for obtaining BHET and higher oligomers through the de-polymerisation of polyester scraps by using ethylene glycol and then obtaining reconstituted polyester by polymerising the BHET and higher oligomers immediately. This is done because the BHET and higher oligomers, thus obtained, is unstable when stored at high temperature and degrades.

In another example, U.S. Pat. No. 4,609,680 discloses a process for depolymerisation of polyester scrap wherein PET scrap is depolymerised to bis-hydroxyethyl terephthalate (BHET) and/or its oligomers by supplying the scrap, together with ethylene glycol, to a reactor containing molten BHET from which a part of the product in the reactor is removed to a polymerising reactor.

Current chemical PET recycling processes thus preclude the recovered ester from a single recycling plant from being used across a wider range of downstream product applications. This increases the commercial risk and burden on capital investment for a recycler using such chemical recycling processes to install such downstream conversion facilities within the same complex, tailored narrowly to a particular end product and market.

Hence, there is need for a process wherein the esters produced by the glycolysis of PET waste can be stored for use as and when desired.

SUMMARY OF THE INVENTION

It has now been found that solid flakes of ester mixtures which can be stored for use as and when desired. The solid flakes of the invention are prepared by reducing the glycol content of the ester mixture. The invention is well suited for use in recycling PET waste.

According to a first aspect of the invention, there is provided flakes of an ester mixture comprising bis-(hydroxyethyl)-terephthalate, dimers, trimers, tetramers, pentamers and higher oligomers of ethane-1,2-diol and terephthalate acid.

The flakes of an ester mixture of the present invention are crystalline, free flowing, non-sticky, stable, storable and reusable. In addition to polymerising the ester flakes to prepare PET products in the thermoplastic segments (e.g. textiles, bottles and rigid packaging, and PET film), the flakes of ester of the invention can also be used directly as major feedstocks for unsaturated polyester, polyurethane foams and polymer concrete or as a precursor for dimethyl terephthalate (DMT) by methanolysis or terephthalic acid by hydrolysis.

In a preferred embodiment, the flakes of the ester mixture have a melting point at or below about 150° C. Preferably, the flakes of the ester mixture have a melting point in the range of from 120 to 150° C.

In a preferred embodiment, the flakes of an ester mixture comprise 2.5% or less of diethylene glycol, 45 to 55% bis(hydroxyethyl) terephthalate, 25 to 35% dimers, 10 to 15% trimers, 3 to 8% tetramers, 1 to 2% pentamers and higher oligomers.

According to a second aspect of the invention, there is provided a method for producing flakes of an ester mixture comprising bis-(hydroxyethyl)-terephthalate, dimers, trimers, tetramers, pentamers and higher oligomers of ethane-1, 2-diol and terephthalate acid, the method comprising:

a) flash evaporating ethane-1,2-diol (glycol) from the ester mixture; and b) producing flakes of the ester mixture of step (a).

In this specification including the claims, "free glycol" is defined as ethane-1,2-diol (monoethylene glycol) that is not chemically bound to the ester molecules by any chemical bond. It can be identified and quantified as a separate and distinct known chemical compound using standard tests known to persons skilled in the art.

The free glycol content of the ester mixture from step (a) will impact on the production of flakes in step (b). In a preferred embodiment, the ester mixture of step (a) has a free glycol content of less than about 12%. More preferably, the free glycol content is less than about 5%. Most preferably, the free glycol content is about 2% or less.

In the specification including the claims, "flash evaporation" is used to refer to a phenomenon wherein the ester mixture containing free glycol is pumped from a high pressure zone to a reduced pressure zone. As soon as the ester mixture is exposed to the reduced pressure (eg vacuum) the ethane-1,2-diol immediately vaporizes. The extent of vaporization depends on the conditions used, namely the pressure and the temperature. The composition of the mixture of oligomers in the ester mixture can increase the boiling point of ethane-1,2-diol and thus influence the amount of ethane-1,2-diol removed.

The flash evaporation in step (a) is typically carried out at reduced pressure and at a predetermined temperature. The reduced pressure for the flash evaporation is preferably in the range of from 100 to 300 mbar (10 to 30 kPa). More preferably, the flash evaporation is carried out at about 200 mbar (about 20 kPa). The predetermined temperature for the flash evaporation depends upon the reduced pressure. Preferably, the reduced pressure is applied in such a way that the flash evaporation of the glycol takes place at or below about 220° C. More preferably, the flash evaporation is carried out at a temperature in the range of from 190° C. to 220° C.

It was surprising to find that the conditions used during the flash evaporation did not change the melting point of the ester mixture (ie it remains at or below 150° C.). Normally, the ester mixture would be expected to polymerise to slightly higher oligomers as a result of the use of reduced pressure and elevation in temperature. If any such polymerisation had occurred under these conditions, the melting point would have been higher. In the method of the invention, there is minimal change in the relative proportions of the various oligomers (dimers, trimers, tetramers and pentamers) in the mixture and the melting point remains at or below 150° C.

It was also surprisingly found that there was minimal change in the diethylene glycol (DEG) content in the final flaked ester. Diethylene glycol is an impurity from a side reaction that cannot be removed by downstream polymerisation processes. The diethylene glycol is formed in the process due to chemical reaction between the ethane-1,2-diol molecules and/or ester molecules. Not all of the diethylene glycol is incorporated into the esters and some exists in a free form. Any increase in the diethylene glycol content would undermine the value of the downstream polyesters for applications such as filament yarns or bottles.

The diethylene glycol content test is a test method to estimate total diethylene glycol in the ester mixture. The test dissociates the DEG from the ester molecules and measures them using conventional gas chromatographic techniques. In a preferred embodiment, the ester mixture of step (a) has a diethylene glycol (both free and bound) content of about 2.5% or less.

The flakes can be produced in step (b) using any available method. In a preferred embodiment, a conventional rotary drum flaker is used to quench and solidify the ester mixture to obtain the flakes of the invention. The flakes can also be produced using any other known equipment or methods such as a quench belt or a willing process.

In this specification including the claims, the term "quenching" refers to a process in which the molten ester mixture from step (a) is cooled such that there is adequate crystallization to change the nature of the flake on the flaker drum surface allowing a reduction in the adhesive force that holds the flake onto the drum metal surface and makes it easier to break off.

The temperature of the ester mixture from step (a) and the temperature of the coolant used in step (b) directly impacts on the level of crystallinity obtained in the final ester flake. For example, the rate of cooling on a rotating drum flaker can be controlled adequately to produce recycled ester flakes having thin outer crystalline faces to ensure free flowing of the crystalline flakes. The temperature of the cooling medium in the rotary flaker is preferably maintained in the range of from 8° C. to 90° C. More preferably, the temperature of the cooling medium is maintained in the range of from 70° C. and 80° C. Any known cooling media can be used to maintain the equipment at the desired temperature. For example, the cooling media can be cold or chilled water, brine water, hot water, hot oil, ethane-1,2-diol or any other known cooling or refrigerant means.

The method of the invention may be used in a continuous process, a batch process or a semi-continuous process.

In a preferred embodiment, the ester mixture used to prepare the flakes is obtained from the glycolysis of PET waste. The PET waste which is used to form the recycled esters used in the invention can be PET of any form suitable for recycling, including, but not limited to, post-consumer PET bottles, PET film, polyester textile waste, rigid packaging, etc. The PET waste may be subjected to glycolysis using any methods known to persons skilled in the art. If the PET waste is contaminated then suitable methods include those disclosed in U.S. Pat. Nos. 5,504,121, 5,602,187, 6,518,322 and 7,214,723. The content of those patents is hereby incorporated in full by reference.

Further, the ester mixture obtained from the flash evaporation in step (a) can be directly used for polymerisation to produce PET chips or other PET products. The lower free glycol content enables polymerisation to take place at a lower temperature and in less time compared to the present techniques discussed in the prior art.

According to a third aspect of the invention, there is provided a method for producing PET products from an ester mixture comprising bis-(hydroxyethyl)-terephthalate, dimers, trimers, tetramers, pentamers and higher oligomers of ethane-1,2-diol and terephthalate acid, the method comprising the steps of:

(a) flash evaporating ethane-1,2-diol from the ester mixture; and (b) polymerising the ester mixture from step (a) ready to produce PET products.

The present invention enables wide spread and cost-effective re-use of recycled feedstock at any customer site for the manufacture of polyester bottle resin, filament yarn or any application that requires polyesters. Further, the present invention is beneficial environmentally because it enables a broader use of decontaminated recyclable esters from PET waste.

It is to be understood that both the foregoing general description and the following detailed description of the present invention are exemplary and explanatory and are intended to provide further explanation of the invention as claimed. Reference has been made to preferred embodiments of the invention, examples of which may be illustrated in the accompanying FIGURE. Although the invention is generally described in the context of these embodiments, it should be understood that it is not intended to limit the scope of the invention to these particular embodiments.

BRIEF DESCRIPTION OF DRAWINGS

Various embodiments/aspects of the invention will now be described with reference to the following non-limiting drawing in which:

FIG. 1 is a drawing of a flowchart illustrating one embodiment of a method for producing flakes of recycled esters from PET waste according to the present invention.

DETAILED DESCRIPTION OF A PREFERRED EMBODIMENT

Though the description of the invention herein uses a specific exemplary embodiment for better understanding the invention, this however does not limit the invention to that specific embodiment.

FIG. 1 shows a flowchart illustrating a method for producing flakes of recycled esters from PET waste according to a preferred embodiment of the present invention.

Glycolysis (not shown) of the PET waste is carried out using ethane-1,2-diol. Prior to glycolysis, PET waste is subjected to pre-treatment using known methods including decontamination and reduction in size of the PET waste to facilitate physical transport of the PET waste. The glycolysis process disclosed in U.S. Pat. No. 7,214,723 produces recycled esters having a free glycol content in the range of 17 to 80% depending on the quantity of ethane-1,2-diol used for the glycolysis.

In FIG. 1, the molten recycled esters (including excess ethane-1,2-diol) (A) from the decontamination and glycolysis of PET waste enters the proving vessel (1). The recycled esters proceed via a pump (2) to the filter (3) to remove solid particles, if any, and then sent to a preheater (4) before entering the flash evaporator (5) for flash evaporating the glycol to obtain recycled esters having a free glycol content of less than about 12%, preferably less than about 2%. The ethane-1,2-diol (C) removed during the flash evaporation is captured via a vapour line (6a) and spray condenser (6b) into a collection vessel (7) for recovery and recycling.

As the flash evaporation of glycol in the recycled ester obtained from the glycolysis of the PET waste is carried out below 220° C., there is no significant increase in the diethylene glycol (an impurity which often forms at higher temperatures) content in the recycled ester. The, resultant diethylene glycol content in the recycled ester after the flash evaporation is preferably maintained below 2.5%. Also, the relative proportion of the lower molecular weight esters including BHET, dimers, trimers, tetramer and pentamers in the recycled ester remains similar to that present prior to the flash evaporation.

As shown in FIG. 1, the ester mixture obtained from the flash evaporator (5) then proceeds via a pump (9) to the rotary drum flaker (10) to be quenched and solidified to obtain flakes of recycled ester (B). Alternatively, the ester mixture can be sent to polymerisation (D) for manufacturing PET products such as PET chips, bottles, textiles, PET film, etc.

In FIG. 1, a conventional rotary drum flaker (10) is used for quenching and solidifying the ester mixture to obtain the flakes of the invention. Any known cooling media can be used to maintain the rotary drum flaker at the desired temperature. For example, the cooling media can be cold or chilled water, brine water, hot water, hot oil or any other known cooling or refrigerant means.

The ester mixture forms crystalline solid ester flakes (B) that are chipped off from the drum using a stationary blade in the rotary drum flaker. The chipped off material is in the form of an irregular shaped flake in the range of from 3 mm to 20 mm size. This irregular shaped flake then drops by gravity from the rotary drum flaker onto a conveyor belt (not shown) and is allowed to further cool to a temperature in the range of from about 50° C. to room temperature on the conveyor belt (not shown). At the end of the conveyor belt, the material is then allowed to fall into a packing station (not shown) for packaging into bags as required by further end users after its sale.

The flakes of the ester mixture are crystalline, free-flowing, non-sticky, stable at room temperature, storable and can be transported and reused. At the point of re-use, the ester flakes can be melted using a conventional stirred and heated reactor at about 150° C. into a liquid. This liquid can then be injected into the pre-polymerisation step of any existing on-site or remotely located third party polyester plant for making PET products.

EXAMPLES

The present invention will now be further illustrated in the following non-limiting examples carried out in the manufacturing plant of Polygenta situated at Nashik, India (the "Plant"). It will be understood by those of ordinary skill in the art that various changes in temperature, pressure, and glycol content can be made or equivalents can be substituted without departing from the true spirit and scope of the invention.

Example 1

Batch Process Using Pilot Plant

Known processes were used to conduct glycolysis of PET waste at about 220° C. to produce esters in the Plant. 50 kg of dilute recycled ester was collected into a pan and allowed to cool to a waxy non-flowing solid at room temperature. This recycled ester was then charged into a pilot reactor and heated to about 210° C. with the application of a vacuum of about 300 mbar. This enabled the flash evaporation of the ethane-1,2-diol from the recycled ester. The flash evaporation was carried out for 15 minutes and the free glycol content in the remaining ester in the reactor was measured to be about 11.8%. The recycled ester having a reduced free glycol content was then let down into a pan and allowed to solidify into a hard and brittle solid at room temperature. About 20 kgs of the hard and brittle solid was melted to form a free flowing low viscosity liquid at 150° C. and then poured into a rotary flaker with chilled water at about 10° C. circulating inside the drum. This enabled the solidification and flaking of the low viscosity liquid into flakes of recycled ester.

At this point, the purified recycled ester was in crystalline form. Ester composition tests showed that the flakes comprised 50% bis (hydroxyethyl) terephthalate, 32% dimers, 10% trimers, 4% tetramers, 1% pentamers, with the remaining esters being higher oligomers. Further, the flakes had a free glycol content of 1.9% and a diethylene glycol content of 2.3%. The melting point was 120° C. to 135° C.

The flake was then stored for 7 days at 55±1° C./90±2% relative humidity and then tested and re-used further downstream on-site. No changes in the ester were observed and it was reusable.

Example 2

Batch Process Using Pilot Plant

Known processes were used to conduct glycolysis of PET waste at about 220° C. to produce esters in the Plant. 50 kgs of recycled ester was collected into a pan and allowed to cool to a waxy non-flowing solid at room temperature. This ester was then charged into a pilot reactor and heated to about 205° C. with the application of a vacuum of about 300 mbar. This enabled the flash evaporation of the glycol from the ester. When flash evaporation was completed and the remaining ester in the reactor was tested, it had a free glycol content of 1.9%. The recycled ester was then let down into a pan and allowed to solidify into a hard and brittle solid at room temperature. About 20 kg of the hard and brittle solid was first melted to form a free flowing low viscosity liquid at 150° C. which was then poured into a rotary flaker with chilled water at about 10° C. circulating inside the drum. This enabled the solidification and flaking of the low viscosity liquid into flakes of recycled ester. The recycled ester flakes were crystalline.

Ester composition test results showed that flakes comprised 49.5% bis (hydroxyethyl) terephthalate, 32.27% dimers, 11.86% trimers, 7.12% tetramers, 1.11% pentamers with the remaining esters being higher oligomers. Further, the flakes had a free glycol content of 1.9% and a diethylene glycol content of 2.4%. The melting point was 120° C. to 135° C.

Exposure studies were conducted for stability of the flakes by storing the recycled ester at 55° C.±1 and relative humidity of 90±2% for seven days. There was no physical change in the product in terms of free flowing properties and the weight loss under such storage conditions was negligible (0.24%).

Example 3

Continuous Process to Make Polyester Melt

This example was conducted using a process in accordance with FIG. 1.

A molten ester mixture (A) obtained from the glycolysis and filtration of PET waste having a free glycol content of about 18% was collected into a proving vessel (1) and then led to the downstream process at the rate of 1300 kg/h via a pump (2) and final filter (3). This liquid was then passed continuously through a pre-heater (4) which increased the temperature of the ester mixture from about 185° C. to about 220° C. The hot ester mixture at a temperature of about 220° C. was then introduced continuously into a flash evaporator (5) operating under vacuum, at a pressure of 200 mbar. The glycol that flashed off was continuously led to a spray condenser (6b) where it was condensed, and sub-cooled to a temperature of 40° C. The condensed glycol was then collected into a collection vessel (7). This condensed glycol was then sent for recovery (C). The contents of the flash evaporator (5) were maintained at a level of about 50% and continuously re-circulated at a rate of 21,000 m³/hr via a re-boiler (8) and an ester circulation pump (9). At this point, the contents of the flash evaporator (5) had a free glycol content of about 1.0%. A portion of this re-circulating stream (flow rate 850 kg/h) was then led continuously to a continuous polymerisation plant for conversion into polyester melt with an intrinsic viscosity of 0.63±0.005. This polyester melt was then used to make high quality 100% recycled polyester filament yarn.

Example 4

Continuous Process to Make Ester Flakes

This example was conducted using a process in accordance with FIG. 1.

A molten ester mixture (A) obtained from the glycolysis and filtration of PET waste having a free glycol content of about 18% was collected into a proving vessel (1) and then led to the downstream process at the rate of 1300 kg/h via a pump (2) and final filter (3). This liquid was then passed continuously through a pre-heater (4) which increased the temperature of the ester mixture from about 185° C. to about 200° C. The hot ester mixture at a temperature of about 200° C. was then introduced continuously into a flash evaporator (5) operating under vacuum, at a pressure of 300 mbar. The glycol that flashed off was continuously led to a spray condenser (6b) where it was condensed, and sub-cooled to a temperature of 40° C. The condensed glycol was then collected into a collection vessel (7). This condensed glycol was then sent for recovery (C). The contents of the flash evaporator (5) were maintained at a level of about 50% and continuously re-circulated at a rate of 21,000 m³/hr via a re-boiler (8) and an ester circulation pump (9). A portion of this re-circulating stream (flow rate 850 kg/h) was then led continuously to a conventional rotary drum flaker (10). At this point, this stream had a free glycol content of about 2.0%. The rotary drum flaker (10) was kept cooled by circulating hot water of about 80° C. As the concentrated ester mixture fell on the drum surface of the rotary drum flaker (10) (at flow rate 850 kg/h) it was quenched on the relatively cooler drum surface into a solid. The solid surface was then scraped off from the drum surface using a stationary blade to form flakes (B). The flakes fell by gravity below the stationary blade onto a conveyor belt (not shown) which took the flakes to the packing station (not shown) where the flakes were allowed to fall by gravity into bags (not shown).

The word 'comprising' and forms of the word 'comprising' as used in this description and in the claims does not limit the invention claimed to exclude any variants or additions.

While the present invention has been described herein with respect to the various exemplary embodiments, it will be apparent to one with the ordinary skill in the art that many modifications, improvements and sub-combinations can be made to the invention without departing from the spirit and the scope thereof. Such modifications, combinations and improvements are intended to be within the scope of this invention.

The invention claimed is:

1. A method for producing flakes of an ester mixture comprising bis-(hydroxyethyl)-terephthalate, dimers, trimers, tetramers, pentamers and higher oligomers of ethane-1,2-diol and terephthalate acid, the method comprising the steps of:
   a) flash evaporating ethane-1,2-diol from an ester mixture obtained from the glycolysis of PET (polyethylene terephthalate); and
   b) producing flakes of the ester mixture of step (a), wherein the flakes are crystalline, free-flowing non-sticky, stable, storable and reusable.

2. The method according to claim 1, wherein step (b) is conducted by quenching and solidifying the ester mixture of step (a).

3. The method according to claim 2, wherein the quenching and solidifying is conducted using a rotary drum flaker.

4. The method according to claim 3, wherein the rotary drum flaker in step (b) has a cooling medium at a temperature in the range from 8° C. to 90° C.

5. The method according to claim 3, wherein the rotary drum flaker in step (b) has a cooling medium at a temperature in the range from 70° C. to 80° C.

6. A method for producing PET products from an ester mixture comprising bis-(hydroxyethyl)-terephthalate, dimers, trimers, tetramers, pentamers and higher oligomers of ethane-1,2-diol and terephthalate acid, the method comprising the steps of:

a) flash evaporating ethane-1,2-diol from an ester mixture obtained from the glycolysis of PET; and b) polymerising the ester mixture from step (a) ready to produce PET products.

7. The method according to claim 1 or 6 wherein the free glycol content of the ester mixture after step (a) is less than about 12%.

8. The method according to claim 1 or 6, wherein the free glycol content of the ester mixture after step (a) is about 2% or less.

9. The method according to claim 1 or 6, wherein the ester mixture from step (a) has a diethylene glycol (DEG) content of about 2.5% or less.

10. The method according claim 1 or 6, wherein the ester mixture from step (a) has a melting point at or below about 150° C.

11. The method according to claim 1 or 6, wherein the flash evaporating is conducted at a temperature at or below 220° C.

12. The method according to claim 1 or 6, wherein the flash evaporating is conducted at a temperature at in the range from 190° C. to 220° C.

13. The method according to claim 1 or 6, wherein the flash evaporating is conducted at reduced pressure.

14. The method according to claim 13, wherein the flash evaporating is conducted at a pressure in the range from 100 to 300 mbar (10 to 30 kPa).

15. The method according to claim 13, wherein the flash evaporating is conducted at about 200 mbar (20 kPa).

16. Flakes of an ester mixture comprising bis-(hydroxyethyl)-terephthalate, dimers, trimers, tetramers, pentamers and higher oligomers of ethane-1,2-diol and terephthalate acid, wherein the flakes are crystalline, free-flowing non-sticky, stable, storable and reusable.

17. The flakes according to claim 16, wherein the flakes have a melting point at or below 150° C.

18. The flakes according to claim 16 or 17, wherein the flakes have a diethylene glycol content of about 2.5% or less.

19. The flakes according to claim 16 or 17, wherein the flakes comprise about 2.5% or less diethylene glycol, 45 to 55% bis (hydroxyethyl) terephthalate, 25 to 35% dimers, 10 to 15% trimers, 3 to 8% tetramers, 1 to 2% pentamers and the balance comprising higher oligomers.

20. The flakes according to claim 16 or 17, wherein the ester mixture comprises recycled esters obtained from the glycolysis of PET waste.

21. The method according to claim 1, wherein the flakes have a melting point at or below 150° C.

22. The method according to claim 1, wherein the flakes have a diethylene glycol content of about 2.5% or less.

23. The method according to claim 1, wherein the flakes comprise about 2.5% or less diethylene glycol, 45 to 55% bis (hydroxyethyl) terephthalate, 25 to 35% dimers, 10 to 15% trimers, 3 to 8% tetramers, 1 to 2% pentamers and the balance comprising higher oligomers.

24. The method according to claim 1 or 6, wherein the ester mixture comprises recycled esters obtained from the glycolysis of PET waste.

\* \* \* \* \*